United States Patent
Gerhardt et al.

(10) Patent No.: US 8,993,182 B2
(45) Date of Patent: Mar. 31, 2015

(54) FUEL CELL SYSTEM COMPRISING AT LEAST ONE FUEL CELL

(75) Inventors: Stefan Gerhardt, Schlierbach (DE); Cosimo Mazzotta, Ulm (DE)

(73) Assignee: Daimler AG, Stuttgart (DE)

( * ) Notice: Subject to any disclaimer, the term of this patent is extended or adjusted under 35 U.S.C. 154(b) by 272 days.

(21) Appl. No.: 13/578,906

(22) PCT Filed: Feb. 10, 2011

(86) PCT No.: PCT/EP2011/000632
§ 371 (c)(1),
(2), (4) Date: Sep. 12, 2012

(87) PCT Pub. No.: WO2011/098279
PCT Pub. Date: Aug. 18, 2011

(65) Prior Publication Data
US 2013/0004866 A1    Jan. 3, 2013

(30) Foreign Application Priority Data
Feb. 15, 2010 (DE) .......................... 10 2010 007 977

(51) Int. Cl.
  *H01M 8/02* (2006.01)
  *H01M 8/06* (2006.01)
  *H01M 8/04* (2006.01)
(52) U.S. Cl.
  CPC ...... *H01M 8/04097* (2013.01); *H01M 8/04141* (2013.01); *H01M 8/04156* (2013.01); *Y02E 60/50* (2013.01)
  USPC .......................... 429/414; 429/444

(58) Field of Classification Search
  USPC ......... 429/446, 431, 430, 424, 444, 414, 415; 96/290
  See application file for complete search history.

(56) References Cited

U.S. PATENT DOCUMENTS

| | | | |
|---|---|---|---|
| 7,485,389 B2 | 2/2009 | Blank et al. | |
| 7,572,323 B2 | 8/2009 | Mueller et al. | |
| 2003/0077497 A1* | 4/2003 | Cao | 429/26 |
| 2005/0129993 A1* | 6/2005 | Eisler et al. | 429/17 |
| 2005/0214617 A1* | 9/2005 | Chapman et al. | 429/34 |
| 2006/0081130 A1* | 4/2006 | Muller et al. | 96/290 |

(Continued)

FOREIGN PATENT DOCUMENTS

| | | | |
|---|---|---|---|
| DE | 10 2008 038 083 A1 | 4/2009 | |
| EP | 1 383 191 A1 | 1/2004 | |

(Continued)

OTHER PUBLICATIONS

Chinese Office Action dated Apr. 2, 2014, including English translation (eleven (11) pages).

(Continued)

*Primary Examiner* — Kenneth Douyette
(74) *Attorney, Agent, or Firm* — Crowell & Moring LLP

(57) ABSTRACT

A fuel cell system includes at least one fuel cell and a circulation system for anode exhaust gases of the fuel cell around an anode region. The fuel cell system also includes a drain line for feeding liquid and water from the region of the circulation system into a process air flow to a cathode region of the fuel cell. The drain line opens into a line element for the process air flow which runs from a lower position into an upper position arranged higher when used properly in the direction of gravity. The flow of the process air runs from the lower position to the upper position of the line element.

14 Claims, 2 Drawing Sheets

(56) References Cited

U.S. PATENT DOCUMENTS

Figure 4:
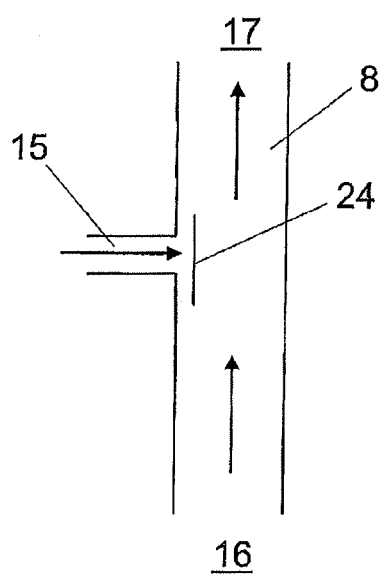

| | | |
|---|---|---|
| 2008/0090124 A1 | 4/2008 | Barleben et al. |
| 2010/0151284 A1* | 6/2010 | Burch et al. ............ 429/13 |

FOREIGN PATENT DOCUMENTS

| | | |
|---|---|---|
| JP | 2000-90954 A | 3/2000 |
| JP | 2005-203179 A | 7/2005 |
| JP | 2006-216241 A | 8/2006 |
| JP | 2007-26757 A | 2/2007 |
| WO | WO 02/056402 A2 | 7/2002 |
| WO | WO 2008/052578 A1 | 5/2008 |
| WO | WO 2008/061094 A1 | 5/2008 |
| WO | WO 2008/154990 A1 | 12/2008 |

OTHER PUBLICATIONS

European Office Action dated Jun. 27, 2014 (six pages).
PCT/ISA/237 Form (Seven (7) pages), Aug. 2011.
International Search Report including English language translation dated Jul. 14, 2011 (Eight (8) pages).

* cited by examiner

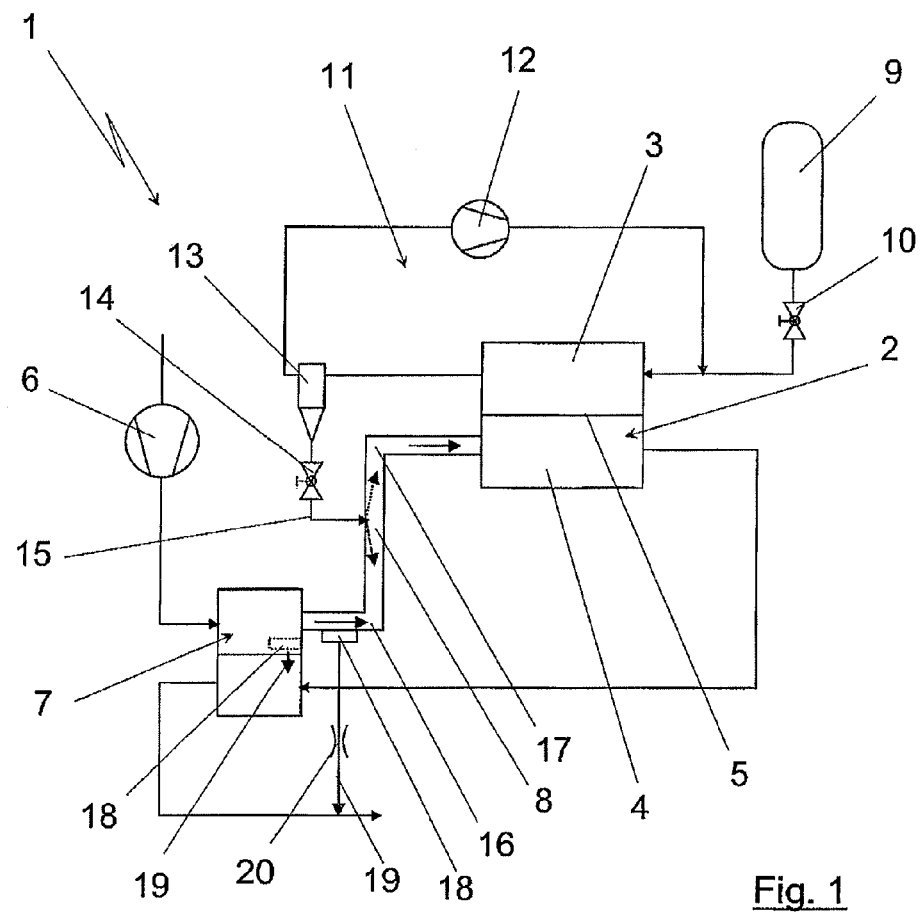
Fig. 1
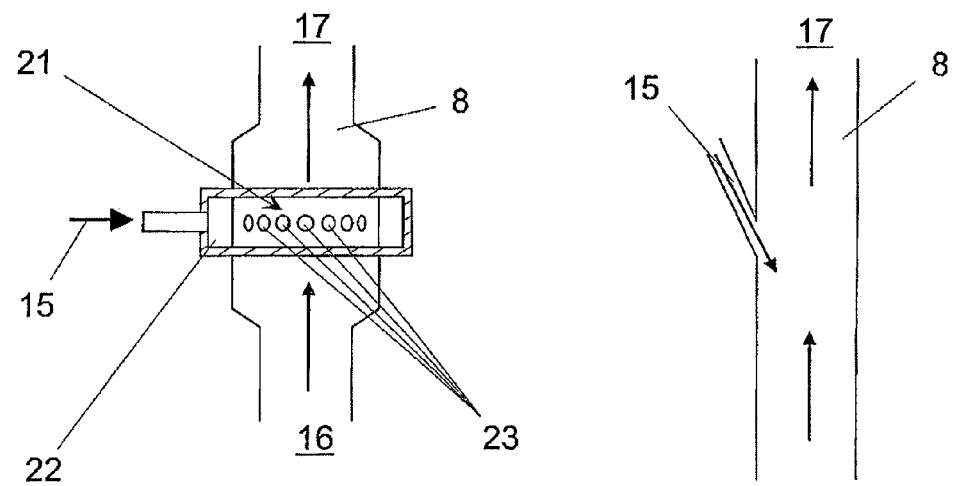
Fig. 2
Fig. 3

FUEL CELL SYSTEM COMPRISING AT LEAST ONE FUEL CELL

BACKGROUND AND SUMMARY OF THE INVENTION

Exemplary embodiments of the present invention relate to a fuel cell system with at least one fuel cell.

PCT International Publication WO 2008/052578 A1 discloses a fuel cell system with a circulation system of anode waste gases of the fuel cell around an anode region thereof, which is described as a fuel circuit. It also discloses providing a drain line for draining liquid and gas from the region of the circulation system. This drain line, which removes liquid and gas, can thereby lead into the process air flow to a cathode region of the fuel cell.

The functionality of this structure is very good as a certain quantity of residual hydrogen is also present in the gas from the circulation system of anode exhaust gases besides the water and nitrogen enriching with time, the quantity of residual hydrogen thermally reacting on the catalysts in the cathode region of the fuel cell. Emissions of hydrogen into the environment of the fuel cell system are thus safely and reliably avoided.

In case of unfavorable load situations, for example a sudden load variation, in addition to the entry of a certain residual quantity of hydrogen into the cathode region, a comparatively large amount of water also enters into the region of the cathode. In particular, if the process air is already moistened by means of a moistener, which is frequently the case, this water will then be present largely in liquid form in the cathode region. An impairment in the performance of the fuel cell can then arise in that it blocks channels for the process air or wets corresponding surfaces. Individual cells of the fuel cell typically constructed as a cell stack can then exhibit power losses due to an under-supply of process air. In the worst case scenario pole reversal of individual cells can even arise so that the functioning of the fuel cell is impaired in the long term.

Exemplary embodiments of the present invention provide a fuel cell system with at least one fuel cell that avoids these disadvantages and is configured in such a way that it works reliably in all operating situations and with the best performance properties.

According to exemplary embodiments of the present invention the drain line opens into a line element for the process air flow, thus further before the cathode region of the fuel cell. However, this line is configured according to the invention so that it extends from a lower position into an upper position arranged higher when used properly in the direction of gravity. The flow of the process air thereby runs likewise from the lower position to the upper position. The drain line thus opens into an ascending pipe with upwardly orientated flow of the process air. This has decisive advantages. The gas coming from the drain line, typically hydrogen, is carried along in any case by the flow and goes into the cathode region of the fuel cell where it is thermally transformed in a known manner. This is guaranteed even with low flow speeds, for example during idling of the fuel cell system. If for any reason, for example the fuel cell system being switched off in the stop phase of a start/stop operation, no flow prevails in the line element and the hydrogen rises due to its low density nonetheless in the direction of gravity upwards and thus arrives in the region of the inlet to the cathode region of the fuel cell. The liquid, typically water, which has entered via the drain line into the line element is also drawn along in part by the flow in case of higher flow speeds and thus arrives—as has also been the case thus far—in the cathode region of the fuel cell. This is comparatively uncritical in case of a higher process air flow as in these situations a lower quantity of liquid in comparison with process air enters the cathode region of the fuel cell. A further part will in any case, also due to gravity, run down in the line element. The lower the flow speed of the process air flow the higher is the liquid portion which runs down in the line element and does not reach the cathode region of the fuel cell. If a certain flow speed of the process air flow is not reached all the liquid runs down in the line element.

With this structure of the fuel cell system according to the invention the entry of greater quantities of liquids or water into the cathode region of a fuel cell can be safely and reliably avoided so that the fuel cell exhibits a comparatively good and regular performance capacity across all operating situations.

This structure also allows the fuel cell system to be operated with high dynamics in relation to power without fearing massive power losses or the like. This predestines the fuel cell system with the structure according to the invention for use in a vehicle, in which it supplies, for example, the drive energy for the electric driving of the vehicle. Since particularly when driving vehicles highly dynamic power profiles are required the above-mentioned structure is particularly advantageous for such a use.

According to a particularly favorable and advantageous development of the fuel cell system according to the invention the line element extends at an angle of more than 45 degrees, in particular more than 80 degrees, with respect to the horizontal. The functionality according to the invention works in principle in case of any line element extending upwards at a corresponding angle. The steeper the angle the better the liquid can run downwards against the flow of the process air. A vertically upwardly extending line element or a line element extending upwards at least at an angle of more than 45 degrees or in particular more than 80 degrees would be ideal. As such, a line element is frequently easier to realize compared with a vertically upwardly extending line element due to the packaging of the fuel cell system, in particular in the abovementioned preferred use in a vehicle, a steeply upwardly extending pipe can of course be used which does not stand directly vertically on the horizontal.

In a further very favorable and advantageous embodiment of the fuel cell system according to the invention the drain line is formed in the region where it opens into the line element so that the liquid and gas that have entered reach the region of the walls of the line element. In particular, in case of incorporation of the gas and the liquid from the drain line into the region of the walls of the line element, the liquid can very easily run down in the region of the walls, as here—due to the friction between the flow of the process air and the walls—the flow speed is always somewhat lower.

In a further very favorable and advantageous embodiment of the fuel cell system according to the invention the cross-section of the line element is at least temporarily widened in the region where the drain line opens into the line element. Through such a widening of the flowable cross-section of the line element a reduction in the flow speed in the region of this process air is achieved—with a constant volume flow of the process air—due to the greater flowable cross-section. Through the reduction of the speed of the process air at least in the region in which the drain line opens into the line element very advantageous flow conditions can be created in order to encourage downward running of the liquid in the line element even with higher process air flow.

In a further very advantageous development of the fuel cell system according to the invention the drain line is formed in the region where the drain line opens into the line element so that the liquid and gas that have entered flow at least partially against the flow direction of the process air flow. Also with this structure, in which the substances are incorporated from the drain line contrary to or with a movement component contrary to the flow direction of the process air flow, a very advantageous effect is achieved with regard to downward running of the liquid in the line element. The substance mixture flowing out of the drain line into the region of the line element due to the pressure difference thus has a certain speed in the region of the inflow. Through a targeted inflow contrary to the speed of the process air flow, the speed of the inflowing substance mixture must first be reversed with energy from the process air flow before this can carry along the gas and in particular the liquid. Due to the very low density of hydrogen the latter undergoes in any case a reversal of its flow direction and is carried along. In case of rather heavy liquid droplets this will only be the case with higher flow speeds of the process air flow so that the majority of the liquid will run down or drip down contrary to the flow direction of the process air flow in the line element and here in particular in the region of the walls of the line element.

According to a very favorable embodiment of the fuel cell system according to the invention a container for collecting liquid is arranged in the flow direction of the process air before or in the region of the lower position. Such a container can receive the liquid running down in the line element and correspondingly store this so that the process air flow cannot carry along the collected liquid in the direction of the cathode region of the fuel cell. In an advantageous embodiment the container for collection of liquid is connected via a line to the exhaust air flowing out of the cathode region of the fuel cell. Through such a line, which can have either a diaphragm or a narrow point or even a valve, a connection of the container to the exhaust air from the fuel cell can be achieved. Thus the collecting liquid can be fed via the exhaust air of the fuel cell out of the fuel cell system in order to thus prevent entry or flow-through of the cathode region with the liquid.

According to a very advantageous embodiment of the fuel cell system according to the invention the line element is arranged between a moistener and the cathode region of the fuel cell, wherein the container for the collection of liquid and/or the line is/are formed integrated into the moistener. Fuel cell systems very frequently have moisteners in order to correspondingly moisten the process air after compression and before flowing into the cathode region. This is particularly important with fuel cells that are constructed as a stack of PEM fuel cells in order to protect the proton exchange membranes from drying out. Such moisteners are thereby frequently structured so that via a membrane, which is permeable to water vapor, the process air flow to the cathode region of the fuel cell is guided separately from the exhaust air flow from the cathode region of the fuel cell. As the exhaust air flow from the cathode region of the fuel cell is loaded with the product water produced in the fuel cell largely in vapor form, also partly in the form of droplets, this exhaust air flow can moisten the comparatively warmer and dryer process air flow to the cathode region of the fuel cell correspondingly. In such a moistener either the container and/or the line can be integrated. The structural resources can thereby be minimized as it is merely in the moistener that a connection provided with a throttle point or a valve means must be created between the exhaust air region and the container in the region of the process air.

According to a further very favorable embodiment of the fuel cell system according to the invention that the container is formed so that it can be heated. Liquid that has collected in the region of the container can thereby be vaporized due to the heating and thus serves for further moistening of the process air flow. The heating can thereby take place actively, for example, through an electric heating element or similar. With correspondingly robust membranes this structure also facilitates (as appropriate) the omission of a moistener as through the active vaporization of the collected liquid in the container a possibly sufficient moistening of the process air flow, which then arrives comparatively hot and dry in the region of the container, can be achieved.

In an alternative embodiment the container is in heat conducting contact with a heat generating component. The vaporization of the liquid collecting in the container can then serve to moisten the process air flow and also to at least partial cool the heat generating component in thermal contact with it, for example of an electric motor component, electronic power unit, or similar.

BRIEF DESCRIPTION OF THE DRAWING FIGURES

Advantageous embodiments and developments of the fuel cell system according to the invention also follow with the aid of the exemplary embodiment which will be described in greater detail below by reference to the drawings, in which:

FIG. 1 shows an example fuel cell system in a possible embodiment according to the invention; and FIG. 2-FIG. 5 show different preferred embodiments of the region in which a drain line opens into a line element.

DETAILED DESCRIPTION

An exemplary fuel cell system 1 can be seen from FIG. 1 as it can be configured, for example, to provide electric drive power for a vehicle. A fuel cell 2, which is to be constructed preferably as a stack of PEM fuel cells, thereby forms the core of the fuel cell system 1. An anode region 3 of the fuel cell 2 is separated from a cathode region 4 of the fuel cell by proton conducting polymer membranes 5. Process air for supplying the cathode region 4 of the fuel cell 2 with oxygen is fed via a compressor 6 to this structure of the fuel cell 2, which is known in itself. This process air can be fed after the compressor 6 via a moistener 7, which is known in itself, but which is to be optionally provided here, in which moistener 7 the process air flows through membranes permeable to water vapor separately from the exhaust air from the cathode region 4. As the exhaust air from the cathode region 4 is loaded with the product water of the fuel cell 2, partially in vapor form and partially in liquid form, at least the water vapor from the exhaust air of the cathode region 4 can moisten the process air flow through the membranes in the moistener 7. This thus moistened or at least partially moistened process air flow then arrives through a line 8 into the cathode region 4 of the fuel cell 2. The moistened process air flow can thus contribute towards reducing the drying out of the polymer membranes 5. The exhaust air flow in turn passes—as just described—through the moistener 7 and can then be discharged into the environment. Residual energy in the exhaust air flow can optionally also be used via a turbine.

Hydrogen from a compressed gas storage element 9 is fed to the anode region 3 of the fuel cell 2 in the embodiment shown here by means of a valve means 10 that regulates the hydrogen supply and reduces the pressure. In the compressed gas storage element 9 the hydrogen is typically stored under very high pressures, for example under pressures above 700 bar.

In order to supply the whole anode region 3 of the fuel cell and here the whole available surface of the polymer membranes 5 with a sufficient quantity of hydrogen, typically more hydrogen is fed to the anode region 3 than can be converted in it. The remaining hydrogen is then fed via a circulation system 11 and a recirculation conveying means 12 as anode exhaust gas in the circuit around the anode region 3 and then arrives mixed with fresh hydrogen from the compressed gas storage element 9 back in the anode region 3. Over time nitrogen and water will enrich in this circulation system 11 in the known way. In order to always have a sufficiently high concentration of hydrogen in the anode region 3 the water and the inert gas, usually nitrogen, which is diffused through the polymer membranes 5 out of the cathode region 4 into the anode region, must be blown out. A water separator 13, in which the water from the circulation system 11 correspondingly collects, serves for this purpose. The water separator 13 is connected via a valve means 14 to a drain line 15. If the valve means 14 is opened, water firstly passes through the drain line 15 and then the gas found in the circulation system 11, whereby the undesired nitrogen and unfortunately still also a certain quantity of hydrogen are blown out of the circulation system 11. This process is described as a purge if applied to water and as a drain if applied to the gases.

In order to avoid causing any hydrogen emissions into the environment of the fuel cell system 1, the drain line 15 opens into the process air flow flowing to the cathode region 4 of the fuel cell 2 so that substances expelled via the drain line 15 are passed via the process air flow into the cathode region 4 of the fuel cell 2. Any residual hydrogen can then thermally react in the region of the electro-catalysts of the cathode region 4. This process according to the prior art can be unfavorable in certain operating situations as the water incorporated into the cathode region 4 can lead to power losses or to blocking of the air channels in the region of individual cells of the fuel cell 2. The performance and power capacity of the fuel cell 2 are thereby possibly limited.

This can be prevented with the structure of the invention. As can be seen in FIG. 1, the line element 8 extends as an ascending line element 8 from a lower position 16 to an upper position 17, so that when used properly the flow of the process air takes place against gravity upwards through the line element 8 and then into the cathode region 4 of the fuel cell 2. In the region of this line element 8 the drain line 15 opens, for example centrally, in the region of the line element 8 extending inclined or vertically upwards from the lower position 16 to the upper position 17. In all typical operating situations the hydrogen contained in the drain line 15 is carried along—as shown by the dotted arrow—by the flow of the process air and reaches the cathode region 4, in which it—as already mentioned and as known from the prior art—is thermally converted in the region of the electro-catalysts of the cathode region 4. This is guaranteed even with low flow speeds and can even be achieved when in certain operating situations, for example in case of a temporary standstill of the fuel cell system 1 within the scope of a start/stop operation in a vehicle, it is switched off, as the hydrogen—due to its low density—ascends in the region of the line element 8 and thus reaches the cathode region 4 of the fuel cell 2.

The water that is also conveyed via the exhaust air line 15 into the region of the line element 8 and that is predominantly in liquid form will—as indicated by the arrow shown in dashes—flow downwards in the direction of gravity in the line element 8, thus into the region of the lower position 16 or respectively the droplets will fall contrary to the flow of the process air flow into the region of the lower position. Parts of the water are thereby vaporized in the process air flow, which may not yet be saturated with hydrogen and can serve for the improvement of the moistening of the process air flow. The liquid water arrives in the region of the lower position 16 and runs either back into the moistener 7 or collects in an optional container 18, which can be arranged either in the region of the lower position 16 or in the moistener 7. This will typically function in case of low and medium flow speeds of the process air flow without further limitations. Only with very high flow speeds of the process air flow is a part of the water carried along and arrives—as also the case thus far—in the cathode region 4 of the fuel cell 2. As a very high process air flow with correspondingly high flow speeds arises, however, only with a high power of the fuel cell 2 itself, this is comparatively uncritical in these situations as due to the high volume flow of the process air and the high exhaust heat of the fuel cell 2 produced due to the high power the percentage of water is comparatively low and this can largely evaporate in the heat of the fuel cell.

Therefore, particularly in situations, in which due to an operation at low load and/or during idling the entry of water into the cathode region 4 of the fuel cell 2 is highly undesirable, a reliable solution is provided that can prevent, with minimum resources, penetration of water, at least in larger quantities, into the cathode region 4 of the fuel cell 2. The water can then collect in the already mentioned container 18, which is shown here in two optional positions. The solid illustration of the container 18 in the region of the line element 8 between the moistener 7 and the lower position 16 of the line element 8 allows a collection of the water before this flows back into the moistener 7. Through a line element 19 this water can flow into the region of the exhaust air flow, here for example into the region of the exhaust air flow after the moistener 7, and is expelled from the system. A throttle element 20 is also indicated in the region of the line 19. A valve means would also be conceivable in place of the throttle element 20. The second alternative for the container 18, shown in dashes, provides for integration of the container 18 into the moistener 7. A simple line 19', likewise provided with a throttle element or optionally a valve means, then extends between the incoming air side of the moistener 7 and the exhaust air side thereof in order to achieve a comparable effect.

It can optionally be provided that the container 18, through which there is a flow of the process air in the moistener or out of the moistener 7, is designed so that the water that collects in the container 18 can subsequently evaporate in the process air not yet saturated to 100% with moisture. This can take place either passively through pure contact with the process air or actively in that the container 18 is correspondingly heated. Such heating could, for example, take place actively through an electric heating element. Alternatively or additionally it would also be possible to form the container 18 in heat conducting contact with a heat generating component. Through this heating likewise the vaporization of the liquid and thus the further moistening of the process air flow are facilitated. In addition through the vaporization and the heat conducting contact with a heat generating component this can be simultaneously cooled. Possible examples for such a heat generating component, which could also profit from cooling through the vaporizing water, would be for example electric motor components, in particular an electric motor of the recirculation conveying means 12, the compressor 6 or similar. Also other components, such as for example motor power components, or the connection to a cooling circuit of the fuel cell 2 would be conceivable.

In the illustrations of FIGS. 2 to 5 various possibilities are shown in order to facilitate—through an apt embodiment of the drain line 15 opening into the line element 8—a running down of the water contrary to the flow speed in the line element 8.

In the illustration of FIG. 2 the incorporation of the substances from the drain line 15 takes place via an annular nozzle 21, wherein an annular space 22 is flooded by the substances from the drain line 15 and connected via corresponding openings 23 with the line element 8. In the region of the annular nozzle 21 the cross-section of the line element 8 is correspondingly widened. With constant volume flow of the process air and such a cross-sectional widening, a reduction in the flow speed results. Water incorporated into the line element 8 can thus run down—contrary to the flow of process air shown by the arrows—in the direction of gravity to the line element 8 and run along the walls thereof into the lower position 16.

In the illustration of FIG. 3 the line element 8 is shown without a widening cross-section. The connection of the drain line 15 is thereby designed so that the substances are brought out of the drain line 15 contrary to or at least with a direction component contrary to the flow direction of the process air and thus gravity obliquely downwards into the region of the line element 8. The comparatively light hydrogen is then carried along very rapidly by the flow of the process air. The heavier water must firstly be reversed in its flow direction so that a majority of the water is not carried along by the flow of the process air but can instead flow in the direction of the lower position 16.

In the illustration of FIG. 4 a further alternative is shown, in which the opening of the drain line 15 is configured so that it takes place at a virtually right angle into the region of the line element 8. In order to prevent the substances flowing out of the drain line 15, and here in particular the water, reaching the central region of the process air flow, a deflector plate 24 is provided which deflects the flow coming from the drain line 15 and ensures that the liquid water can flow in the region of the walls of the line element 8 into the lower position 16. A similar structure with an annular deflector plate would obviously also be conceivable when using an annular nozzle.

Figure 5:
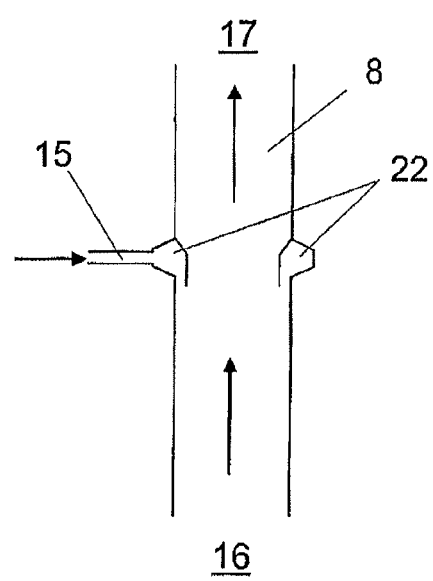

Finally, FIG. 5 shows a structure in which the substances flowing from the drain line 15 flow once again via an annular channel 22 into the region of the line element 8. By means of suitable guiding elements 25 an inflow contrary to the flow direction of the process air flow and simultaneously an inflow along the wall of the line element 8 are ensured. This also facilitates the flowing of the liquid water down to the lower position 16, but while the hydrogen is nonetheless carried along by the process air flow.

The variants shown in FIGS. 2 to 5 should be understood purely as examples and can also be combined as desired. They serve to further improve the effect according to the invention which would also be achievable with a purely T-shaped opening of the drain line 15 into the line element 8 and to increase the value of the flow speed of the process air, from which no water is carried along by the process air flow.

All in all the structure of the fuel cell system 1 according to the invention with very simple and cost effective means allows an improvement in the operating stability of the fuel cell 2, in particular electrical power in different highly dynamically changing operating situations. The fuel cell system 1 is therefore particularly suited—besides any other stationary and mobile applications—to providing the drive energy in a vehicle, as here highly dynamic requirements on the power profile of the fuel cell 2 are usual.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A fuel cell system, comprising:
   a fuel cell;
   a circulation system configured to circulate anode exhaust gases of the fuel cell around an anode region;
   a line element carrying process air flow to a cathode inlet of the fuel cell, wherein the line element extends from a lower position into an upper position arranged higher when used in a direction of gravity, wherein the process air flow occurs from the lower position to the upper position; and
   a drain line arranged in the circulation system and configured to supply liquid and gas from a region of the circulation system into the line element,
   wherein the drain line is connected to the line element in such a manner that fuel in the anode exhaust gases passes from the drain line, to the upper position of the line element, and into the cathode inlet.

2. The fuel cell system according to claim 1, wherein the line element is at an angle of more than 45 degrees with respect to the horizontal.

3. The fuel cell according to claim 2, wherein the line element is at an angle of more than 80 degrees with respect to the horizontal.

4. The fuel cell system according to claim 1, wherein the drain line is formed in a region where it opens into the line element in such a way that the liquid and gas that have entered reach a region of walls of the line element.

5. The fuel cell system according to claim 1, wherein a cross-section of the line element widens at least temporarily in a region in which the drain line opens into the line element.

6. The fuel cell system according to claim 1, wherein the drain line is formed in the region where it opens into the line element in such a way that the liquid and gas which have entered flow in at least partly contrary to a flow direction of the process air flow.

7. The fuel cell system according to claim 1, further comprising:
   a container configured to collect liquid, wherein the container is arranged in a flow direction of the process air before or in the region of the lower position.

8. The fuel cell system according to claim 7, wherein the container is connected via a line to exhaust air flowing out of the cathode region of the fuel cell.

9. The fuel cell system according to claim 8, wherein the line element is arranged between a moistener and the cathode region of the fuel cell, wherein the container or the line is integrated into the moistener.

10. The fuel cell system according to claim 7, wherein the container is configured so that it is heated.

11. The fuel cell system according to claim 7, wherein the container is in heat conducting contact with a heat generating component.

12. The fuel cell system according to claim 1, wherein the drain line is connected to the line element by an annular nozzle with a plurality of openings, wherein the annular nozzle is arranged in a cross-sectionally widened area of the line element.

13. The fuel cell system according to claim 1, wherein the line element includes a deflector plate arranged in an area where the liquid and gas from the drain line enter the line element.

14. The fuel cell system according to claim 1, wherein the line element includes an annular channel with guiding elements.

\* \* \* \* \*